United States Patent
Park (10) Patent No.: US 7,815,703 B2
(45) Date of Patent: Oct. 19, 2010

(54) DUST COLLECTING UNIT OF VACUUM CLEANER

(75) Inventor: Sang Jun Park, Gimhae-si (KR)

(73) Assignee: LG Electronics Inc., Seoul (KR)

( * ) Notice: Subject to any disclaimer, the term of this patent is extended or adjusted under 35 U.S.C. 154(b) by 546 days.

(21) Appl. No.: 11/798,182

(22) Filed: May 10, 2007

(65) Prior Publication Data

US 2007/0294856 A1 Dec. 27, 2007

(30) Foreign Application Priority Data

Jun. 27, 2006 (KR) .................... 10-2006-0057777

(51) Int. Cl.
*B01D 45/00* (2006.01)
(52) U.S. Cl. .................. 55/343; 55/DIG. 3; 55/337; 55/345; 55/428; 55/332; 55/430; 55/431; 55/432; 15/352; 15/353
(58) Field of Classification Search ............ 55/337, 55/DIG. 3, 345, 343, 428, 459.1, 321, 332; 15/353, 347

See application file for complete search history.

(56) References Cited

U.S. PATENT DOCUMENTS

| | | | | | |
|---|---|---|---|---|---|
| 3,425,192 | A | * | 2/1969 | Davis ......................... | 55/345 |
| 4,210,427 | A | * | 7/1980 | Brett et al. .................. | 95/276 |
| 6,168,641 | B1 | * | 1/2001 | Tuvin et al. .................. | 55/337 |
| 6,746,500 | B1 | * | 6/2004 | Park et al. .................... | 55/343 |
| 6,782,585 | B1 | * | 8/2004 | Conrad et al. ................ | 15/353 |
| 6,840,972 | B1 | * | 1/2005 | Kim ............................ | 55/337 |
| 7,326,268 | B2 | * | 2/2008 | Oh et al. ...................... | 55/343 |
| 2001/0042283 | A1 | * | 11/2001 | Oh et al. ...................... | 15/353 |
| 2004/0068827 | A1 | * | 4/2004 | Dyson ......................... | 15/353 |
| 2005/0050864 | A1 | * | 3/2005 | Oh et al. ...................... | 55/345 |
| 2005/0172586 | A1 | * | 8/2005 | Oh et al. ...................... | 55/345 |
| 2005/0252180 | A1 | * | 11/2005 | Oh et al. ...................... | 55/345 |
| 2006/0059871 | A1 | * | 3/2006 | Han et al. ..................... | 55/345 |
| 2006/0075728 | A1 | * | 4/2006 | Oh et al. ...................... | 55/345 |
| 2006/0090428 | A1 | * | 5/2006 | Park et al. .................... | 55/337 |
| 2006/0107629 | A1 | * | 5/2006 | Oh ............................... | 55/345 |
| 2006/0123750 | A1 | * | 6/2006 | Lee et al. ..................... | 55/428 |
| 2006/0130265 | A1 | * | 6/2006 | Oh et al. .................... | 15/327.2 |
| 2006/0137304 | A1 | * | 6/2006 | Jeong et al. ................... | 55/337 |
| 2006/0137309 | A1 | * | 6/2006 | Jeong et al. ................... | 55/337 |
| 2006/0150587 | A1 | * | 7/2006 | Hong et al. ................... | 55/343 |
| 2006/0168922 | A1 | * | 8/2006 | Oh ............................... | 55/337 |
| 2006/0168923 | A1 | * | 8/2006 | Lee et al. ..................... | 55/345 |
| 2006/0230717 | A1 | * | 10/2006 | Oh et al. ...................... | 55/343 |
| 2006/0230721 | A1 | * | 10/2006 | Oh et al. ...................... | 55/345 |
| 2006/0230722 | A1 | * | 10/2006 | Oh et al. ...................... | 55/345 |

(Continued)

*Primary Examiner*—Jason M Greene
*Assistant Examiner*—Dung Bui
(74) *Attorney, Agent, or Firm*—KED & Associates, LLP (57) ABSTRACT

A dust collecting unit of a vacuum cleaner has a dust collecting body including a first dust separating unit for separating dust from air and a first dust storing unit for storing the separated dust. A cover member is coupled to the dust collecting body and a second dust separating unit for further separating dust from the air is formed in the cover member. A second dust storing unit for storing dust separated by the second dust separating unit is formed in the dust collecting body. A dust passage for guiding the dust separated by the second dust separating unit to the second dust storing unit is also provided on the dust collecting body.

17 Claims, 5 Drawing Sheets

U.S. PATENT DOCUMENTS

| | | | |
|---|---|---|---|
| 2006/0230725 A1* | 10/2006 | Han et al. | 55/345 |
| 2006/0230726 A1* | 10/2006 | Oh et al. | 55/345 |
| 2006/0254226 A1* | 11/2006 | Jeon | 55/345 |
| 2006/0277872 A1* | 12/2006 | Yoo | 55/337 |
| 2006/0278081 A1* | 12/2006 | Han et al. | 96/61 |
| 2007/0011999 A1* | 1/2007 | Oh | 55/345 |
| 2007/0079473 A1* | 4/2007 | Min et al. | 15/353 |
| 2007/0084160 A1* | 4/2007 | Kim | 55/345 |
| 2007/0084161 A1* | 4/2007 | Yoo | 55/345 |
| 2007/0089381 A1* | 4/2007 | Ni | 55/345 |
| 2007/0095028 A1* | 5/2007 | Kim et al. | 55/337 |
| 2007/0095029 A1* | 5/2007 | Min et al. | 55/345 |
| 2007/0095030 A1* | 5/2007 | Oh | 55/345 |
| 2007/0144116 A1* | 6/2007 | Hong et al. | 55/345 |
| 2007/0209335 A1* | 9/2007 | Conrad | 55/337 |
| 2007/0214754 A1* | 9/2007 | Kim | 55/345 |
| 2007/0289089 A1* | 12/2007 | Yacobi | 15/353 |
| 2007/0289267 A1* | 12/2007 | Makarov et al. | 55/345 |
| 2008/0134649 A1* | 6/2008 | Lee et al. | 55/337 |
| 2008/0263817 A1* | 10/2008 | Makarov et al. | 15/347 |
| 2008/0264009 A1* | 10/2008 | Lee et al. | 55/345 |
| 2008/0264014 A1* | 10/2008 | Oh et al. | 55/423 |
| 2009/0031680 A1* | 2/2009 | Hyun et al. | 55/345 |
| 2009/0205298 A1* | 8/2009 | Hyun et al. | 55/343 |

\* cited by examiner

DUST COLLECTING UNIT OF VACUUM CLEANER

The present application claims priority under 35 U.S.C. §119 to Korean Patent Application No. 10-2006-0057777, filed on Jun. 27, 2006, which is hereby incorporated by reference in its entirety.

BACKGROUND

1. Field

This disclosure relates to a dust collecting unit of a vacuum cleaner.

2. Background

Generally, a vacuum cleaner is a mechanical device using a flow of air generated by a vacuum motor mounted in a main body to remove dust, loose dirt, or other particulate matter contained in the air by filtering the same. Vacuum cleaners are generally classified into canister type vacuum cleaners where a suction nozzle is separated from a main body and connected to the same by a connection tube, and upright type vacuum cleaners where the suction nozzle is integrally formed with the main body. The cyclone type vacuum cleaner is configured to separate and collect dust from the air sucked into the vacuum cleaner by rotating the air using a cyclone principle.

Recently, in order to enhance dust collecting performance, cyclone vacuum cleaners have begun using multi-cyclone dust collecting units. These units typically have the air processed through multiple cyclone units in a serial fashion.

BRIEF DESCRIPTION OF THE DRAWINGS

The embodiments will be described in detail with reference to the following drawings in which like reference numerals refer to like elements, and wherein.

DETAILED DESCRIPTION

Figure 1:
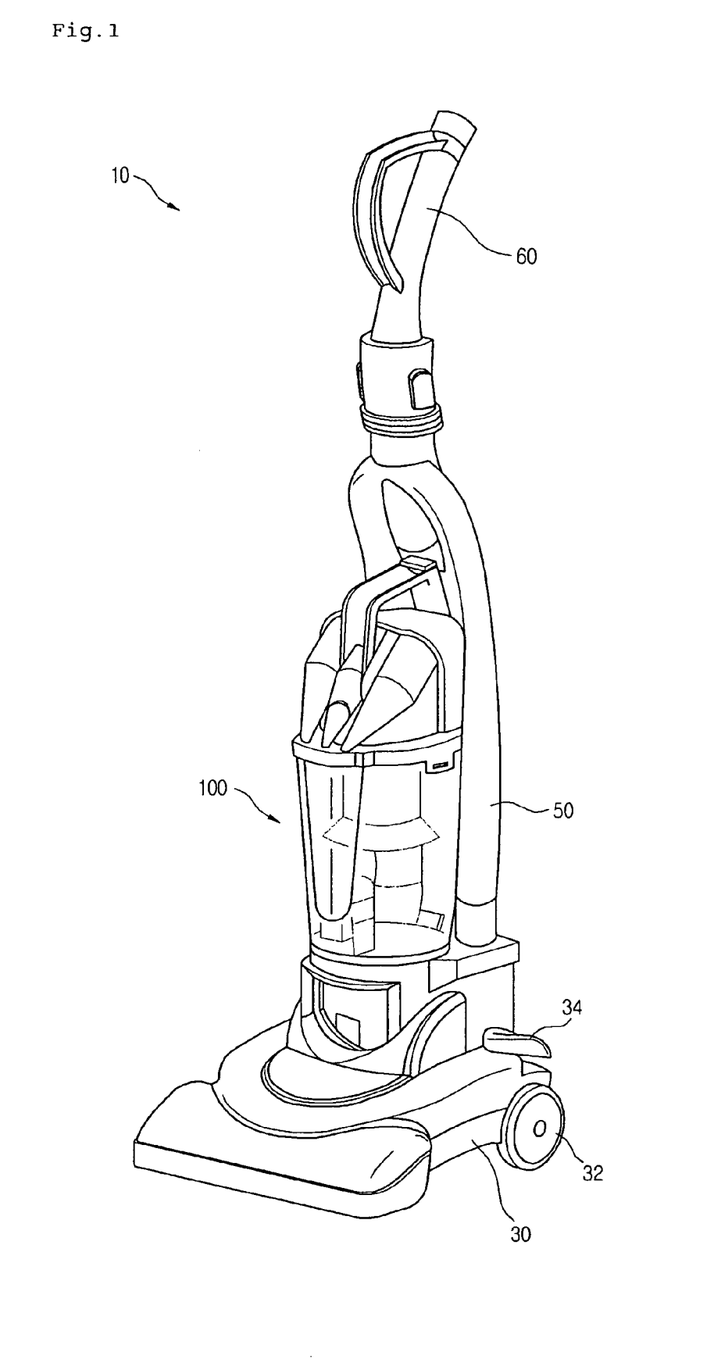
FIG. 1 is a perspective view of an upright type vacuum cleaner.

Referring to FIG. 1, an implementation of an upright type vacuum cleaner 10 includes a suction nozzle 30 for sucking air containing dust while moving along a floor. A main body 50 has a motor for generating a sucking force for sucking the air containing the dust through the suction nozzle 30. A handle 60 is installed on an upper portion of the main body 50. A dust collecting unit 100 for separating the dust from the air sucked through the suction nozzle 30 is also mounted on the main body.

The suction nozzle 30 is configured to suck air through an air inlet (not shown) formed on a bottom thereof while closely moving along the floor. That is, an air inlet (not shown) is formed on the bottom of the suction nozzle 30 to guide the air suction. Wheels 32 are provided on both sides of the suction nozzle 30 to make it easy to move the suction nozzle 30 along the floor.

The main body 50 is pivotally coupled to the suction nozzle 30. For the pivotal motion of the main body 50, a pivot lever 34 is formed on an upper-rear end of the suction nozzle 30. Therefore, when the user grasps the handle 60 and pulls rearward on the main body 50 while depressing the pivot lever 34, the main body 50 pivots rearward. In this state, the user can clean the floor while adjusting the main body 50 at a desired angle in response to his/her height.

The dust collecting unit 100 is detachably mounted on the main body 50. The dust collecting unit 100 separates dust from the air according to the cyclone principle. The following will describe an operation of the above-described vacuum cleaner 1.

When electric power is applied to the vacuum cleaner 1, the motor installed in the main body 50 is driven so that air containing dust can be sucked through the suction nozzle 30 by vacuum pressure generated by the motor. The sucked air is directed into the main body 50 and then to the dust collecting unit 100. Dust contained in the air is separated in the dust collecting unit 100 according to a cyclone principle. The separated dust is stored in the dust collecting unit 100, and the air from which dust is removed is exhausted out of the main body 50.

Figure 2:
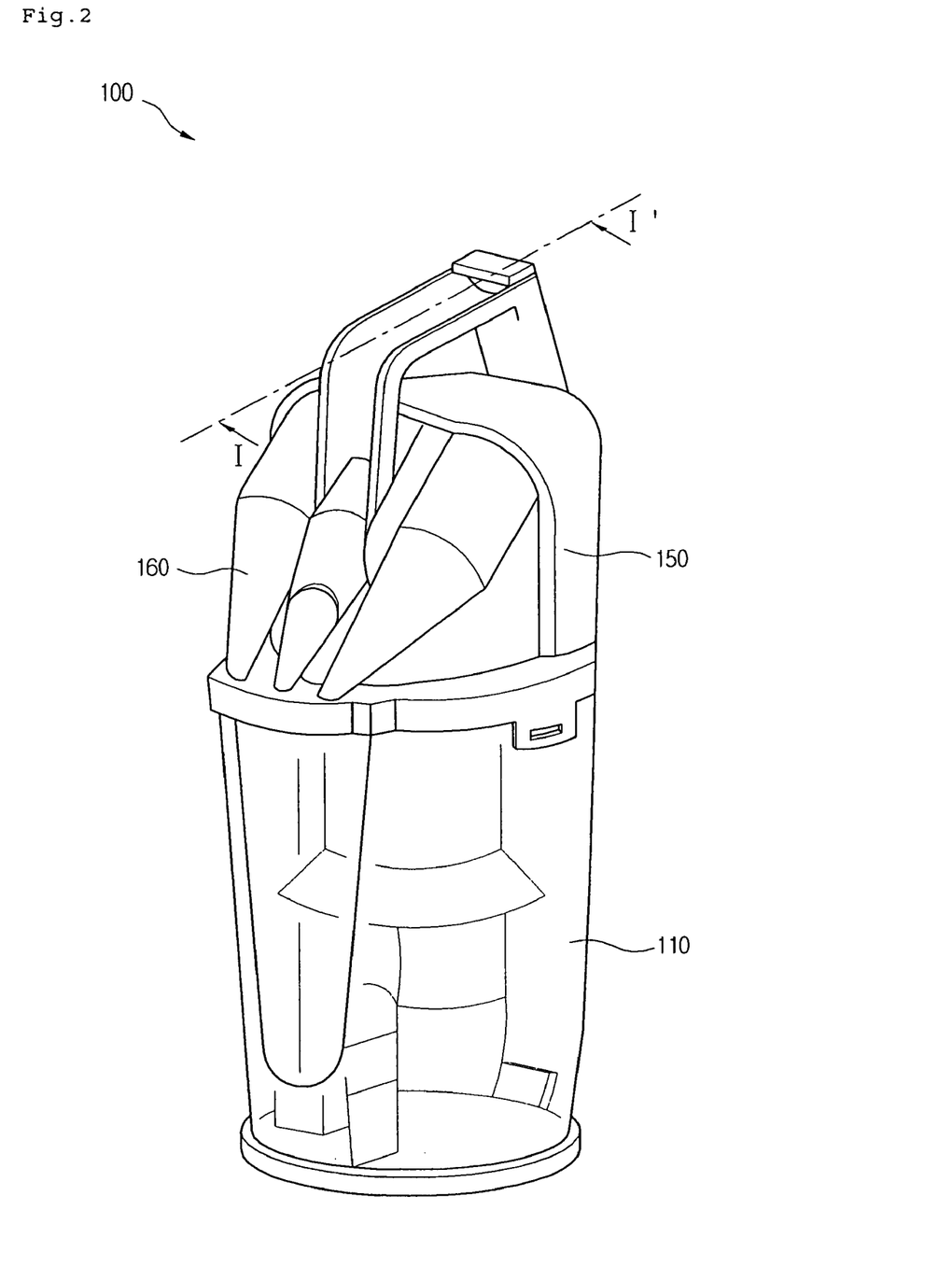
FIG. 2 is a perspective view of a dust collecting unit of a vacuum cleaner.
Figure 3:
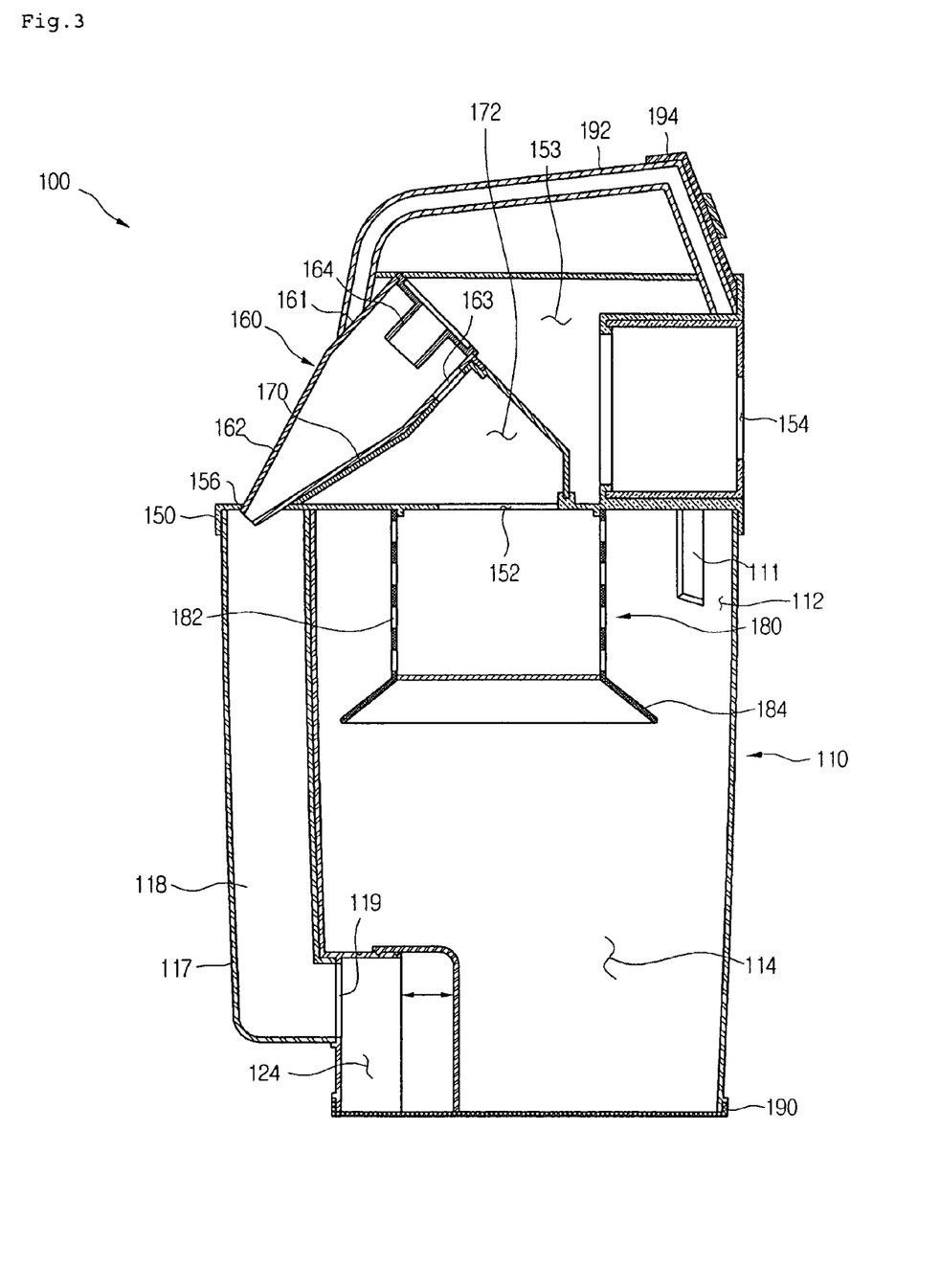
FIG. 3 is a cross-sectional view taken along section line I-I' of FIG. 2.

FIG. 2 is a perspective view of the dust collecting unit and FIG. 3 is a cross-sectional view taken along section line I-I of FIG. 2. Referring to FIGS. 2 and 3, the dust collecting unit includes a dust collecting body 110 defining a space for storing the dust. An upper cover 150 covers an upper portion of the dust collecting body 110. A lower cover 190 selectively opens a lower portion of the dust collecting body 110, thus enabling dust stored in the dust collecting body 110 to be discharged.

The dust collecting body 110 is formed in a cylindrical shape and is provided with an air inlet 111 through which the air containing the dust is directed into the main body. The air inlet 111 may extend in a direction that is tangential to the cylindrical outer surface of the dust collecting body 110 so that the air sucked through the air inlet 111 flows along an inner circumference of the dust collecting body 110 in a spiral direction. When the air moves in this fashion, the dust contained in the air is separated.

Accordingly, the air sucked through the air inlet 111 flows inside the dust collecting body 110, and relatively large-sized dust particles are separated at this stage. That is, the upper portion of the dust collecting body 110 functions as a first dust separating unit 112. A first dust storing unit 114 is formed on a lower portion of the dust collecting body 110 to store dust separated in the first dust separating unit 112.

As described above, the cover member 150 is detachably coupled to the upper portion of the dust collecting body 110. A handle is formed on an upper portion of the cover member 150. A mounting/dismounting lever 194 for enabling the dust collecting unit 110 to be coupled to the main body 50 may be formed on the handle 192. Because the mounting/dismounting lever 194 is formed on the handle 192, the user can separate the dust collecting unit 110 from the main body 50 by simply grasping the handle with one hand.

The cover member 150 is also provided with a second dust separating unit 160. After the air has passed through the first dust separating unit 112, and large dust particles have been removed from the stream of air, the air passes through the second dust separating unit 160 so that smaller dust particles can be removed.

A volume of dust separated in the first dust separating unit 112 is greater than a volume of dust separated in the second dust separating unit 160. Therefore, in order to improve the dust collecting efficiency, a space in which the dust separated in the first dust separating unit 112 is stored is relatively large while a space for storing the dust separated in the second dust separating unit 160 is relatively small.

The second dust separating unit 160 is formed in the cover member 150 so that a storage volume of the first dust storing unit 114 can be maximized.

An air outlet 152 is provided on a bottom of the cover member 150. The air from the first dust separating unit 112 is discharged through the air outlet 152. An upper end of a filter member 180, provided with a plurality of through holes 182, is coupled to the air outlet 152. Therefore, the air from which large dust particles have been separated in the first dust separating unit 112 is discharged out of the dust collecting body 110 through the air outlet 152 via the filter member 180. A shielding unit 184 is formed on a lower end of the filter member 180. The shielding unit 184 prevents dust falling downward in the first dust collecting unit 114 from flowing out of the dust collecting unit with the air passing out of the air outlet 152.

The second dust separating unit 160 is mounted on the cover 150. The second dust separating unit 160 may be inclined with respect to a central axis of the dust collecting body 110. The cover member 150 is provided with a support 170 for supporting the second dust collecting unit 160 at an inclined angle. The support 170 is provided at an inner space with a guide passage 172 for guiding the air discharged through the air outlet 152 to the second dust separating unit 160.

The second dust separation unit 160 includes one or more cyclone units, each formed in a conical-shape. Each of the cyclone units includes a cylindrical part 161, and a cone shaped part 162 extending from a lower end of the cylindrical part 161. An air inlet 163 may be formed in a tangential direction of the cylindrical part 161 so that the air introduced into the cylindrical part 161 can flow along the inner circumference of the cylindrical part 161.

In addition, a discharge guide unit 164 is coupled to the cylindrical part 161. The discharge guide unit 164 guides the air so that it is directed toward the lower portion of the second dust collecting unit 160 while rotating along the inner circumference of the second dust separating unit 160 in a spiral direction. The air then exits the second dust separating unit 160 at an upper portion of the second dust separating unit 160.

When the air flows downward along the inner circumference of the cyclone units of the second dust separating unit 160, an ascending air current is generated at a central portion. The ascending air current is guided by the discharge guide unit 164 to an exhaust passage 153. The upper cover 150 is provided with an air outlet 154 through which the air exhausted to the exhaust passage 153 is exhausted to the main body 50.

The dust separated by the second dust separating unit 160 is discharged out of the second dust separating unit 160 through the cone-shape part 162 of the cyclone units. The dust is stored in a second dust storing unit 124. The second dust storing unit 124 is formed in a portion of the first dust storing unit 114.

The dust collecting body 110 is provided at an outer portion with a passage guide 117, defining a dust passage 118 for directing dust discharged from the second dust separating unit 160 to the second dust storing unit 124. The passage guide 117 may be integrally formed with or coupled to the dust collecting body. The dust passage 118 is formed in a vertical direction and is connected to the second dust storing unit 124 at a side of the dust collecting body 110. That is, the dust collecting body 110 is provided at a side surface with a dust inlet 119 through which dust separated in the second dust separating unit 160 is introduced.

A portion of the cone-shaped part 162 of the cyclones is located in the dust passage 118 over the upper cover 150.

Therefore, the upper cover 150 is provided with a hole, 156 through which the portion of the cone-shape part 162 passes. Accordingly, dust separated in the second dust separating unit 160 is directed to the second dust storing unit 124 through the dust passage 118. The air from which dust is separated is exhausted to the exhaust passage 153 through the discharge guide unit 164.

As described above, relatively small-sized dust particles are stored in the second dust storing unit 124. Therefore, the second dust storing unit 124 may have a relatively small volume.

In the present embodiment, the second dust storing unit 124 may have a variable size. When an amount of dust is being collected in the second dust storage unit is large, the volume of the second dust storing unit 124 may be increased. That is, the second dust storing unit 124 may be designed to vary its volume in accordance with the amount of dust that must be stored therein.

Figure 4:
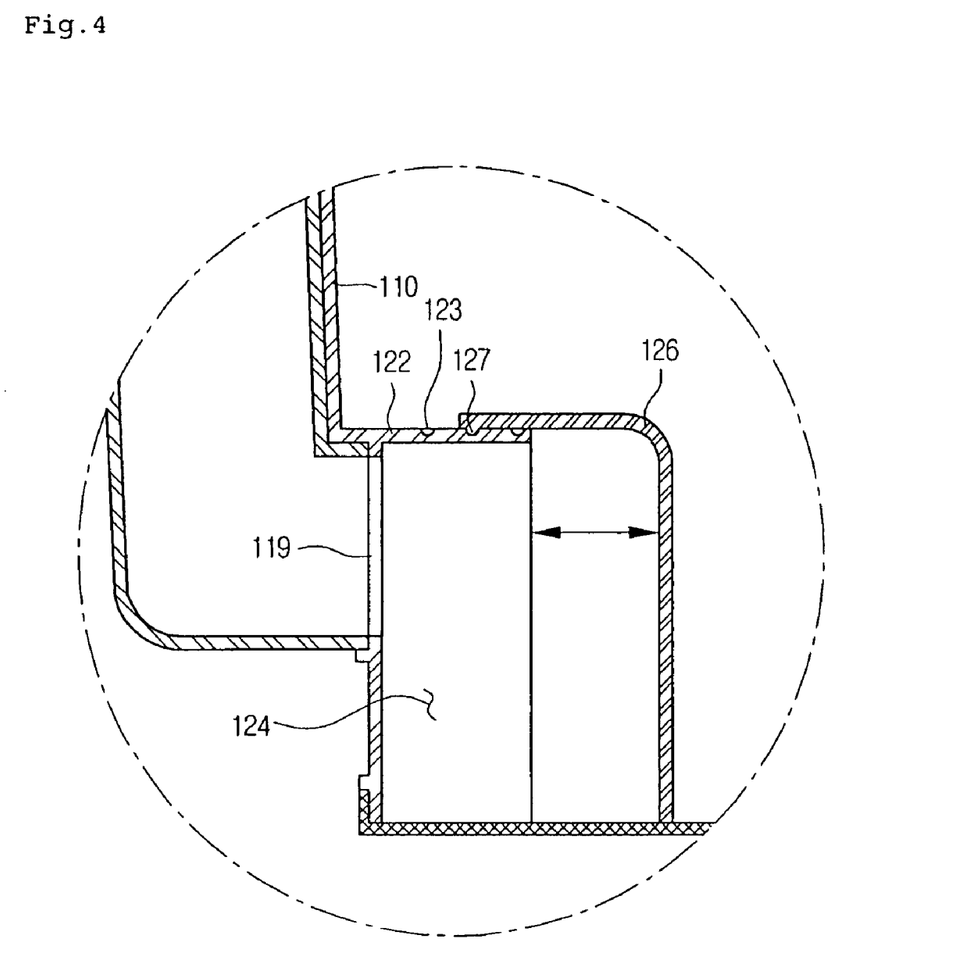
FIG. 4 is a cross-sectional view illustrating an internal structure of a second dust collecting unit.

Referring to FIG. 4, the second dust storing unit 124 includes an inner guide 122 and an outer guide 126 that is capable of moving back and forth along the inner guide 122. The volume of the second dust storing unit 124 may vary in accordance with the reciprocal motion of the outer guide 126.

The inner guide 122 extends from an inner surface of the dust collecting body 110 towards the center of the body, and communicates with the dust passage 118. A cross-section of the inner guide 122 is formed in a □-shape. The outer guide 126 is capable of reciprocating while closing off the open end of the inner guide 122.

In this embodiment, the outer guide 126 is provided at an inner surface with one or more fixing projections 127 that allow the outer guide 126 to be fixed with respect to the inner guide 122 when it moves to a predetermined position. The inner guide 122 is provided with a plurality of insertion grooves 123. One of the insertion grooves 123 will receive at least one of the fixing projections 127. A plurality of insertion grooves 123 are provided so that the volume of the second dust storing unit 124 can be adjusted step by step. Because the outer guide 126 is capable of reciprocating with respect to the inner guide 122, the volume of the second dust storing unit 124 can be adjusted.

Although this embodiment has the fixing projections 127 formed on the outer guide 126, in alternate embodiments the projections may be formed on the inner guide 122. In this case, the insertion grooves 123 would be formed on the outer guide 127.

Figure 5:
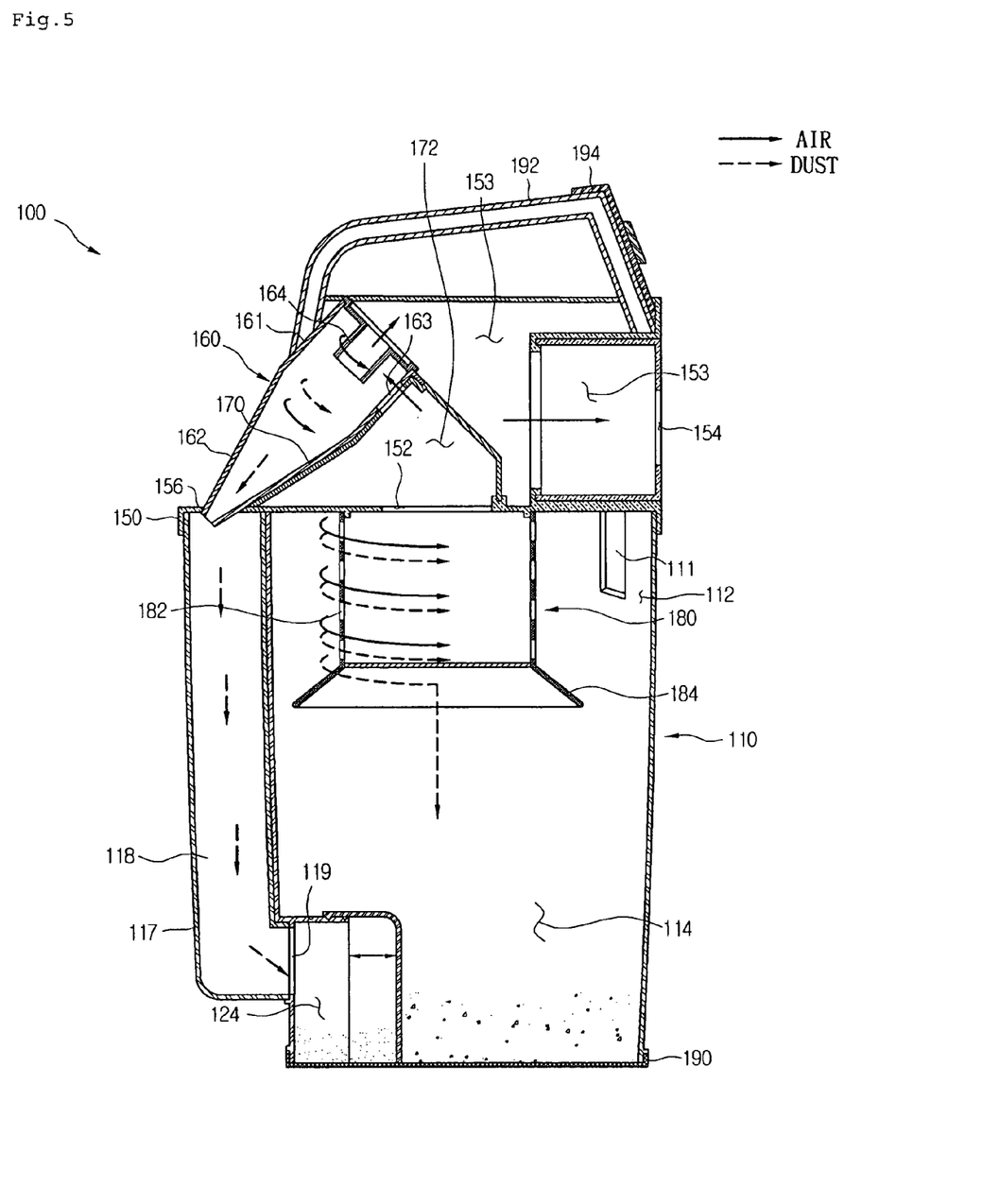
FIG. 5 is a cross-view illustrating a flow of dust and air in a dust collecting unit.

FIG. 5 is a view illustrating the flow of dust and air in the dust collecting unit. The following will describe the operation of the dust collecting unit 100.

When the vacuum cleaner 10 is turned on, air containing dust is sucked into the suction nozzle 30. The air containing dust is directed in a tangential direction of the first dust separating unit 112 through the air inlet 111 of the dust collecting unit 100. The sucked air flows downward along the inner circumference of the first dust separating unit 112 while rotating in a spiral fashion. As the air moves in this fashion, the air and dust are separated from each other by the weight difference between them. The dust, being heavier, will fall down to the bottom of the dust collecting body so that it can be stored in the first dust storing unit 114.

The air, from which dust has been separated, passes through the through holes 182 formed in the filter member 180. The air discharged through the air outlet 152 is introduced into the second dust separating unit 160 along the guide passage 172.

The air is guided in the tangential direction along the inner walls of the cyclones of the second dust separating unit 160 by the air inlet 163. The dust contained in the air is further separated as the air flows in the second dust separating unit 160. As noted above, the second dust separating unit 160 would typically include a plurality of small cyclones. The air, from which additional dust has been further separated, is introduced into the exhaust passage 154. The air discharged to the exhaust passage 154 is exhausted out of the main body 50 through a motor.

The small dust particles discharged from the second dust separating unit 160 are introduced into the dust passage 118, after which they are stored in the second dust storing unit 124. If there is a need to adjust the volume of the second dust storing unit 124, it can be realized by moving the outer guide 126 along the inner guide 122.

In order to empty the dust storing units 114 and 124, the user separates the dust collecting unit 100 from the main body 50. Next, the lower cover 190 is separated from the dust collecting unit 100. Then, dust stored in the dust storing units 114 and 124 is discharged by gravity.

As described because the second dust separating unit 160 is separated from the dust collecting body 110 and provided on the upper cover 150, the interior volume of the first dust storing unit 114 can be maximized.

Further, since the second dust separating unit 160 is separated from the dust collecting body 110, the internal structure of the dust collecting body 110 is simplified and thus dust stored in the dust storing units 114 and 124 can be easily discharged.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although a number of illustrative embodiments have been described, it should be understood that numerous other modifications and embodiments can be devised by those skilled in the art that will fall within the spirit and scope of the principles of this disclosure. More particularly, variations and modifications are possible in the component parts and/or arrangements of the subject combinations which would still fall within the scope of the disclosure, the drawings and the appended claims. In addition to variations and modifications in the component parts and/or arrangements, alternative uses will also be apparent to those skilled in the art.

What is claimed is:

1. A dust collecting unit of a vacuum cleaner, comprising:
a dust collecting body including a first dust separating unit for separating dust from a flow of air and a first dust storing unit for storing dust separated by the first dust separating unit, the first dust separating unit being integrally formed with the first dust storing unit;
a cover member configured to cover an upper portion of the first dust separating unit;
a second dust separating unit mounted on an upper side of the cover member, wherein the second dust separating unit is configured to further separate dust from the flow of air after the flow of air has left the first dust separating unit;
a second dust storing unit that stores dust separated by the second dust separating unit; and
a dust passage for guiding dust separated by the second dust separating unit to the second dust storing unit,
wherein the cover member further covers an upper portion of the dust passage, the cover member including a guide passage that guides the air discharged from the first dust separating unit to the second dust separating unit and an air outlet through which the air exhausted from the second dust separating unit is exhausted to an outside of the dust collecting unit.

2. The dust collecting unit of claim 1, wherein the second dust separating unit comprises at least one cyclone unit that causes dust separated in the second dust separating unit to fall down toward the second dust storing unit, and wherein the flow of air is discharged upward from the second dust separating unit.

3. The dust collecting unit of claim 1, wherein the cover member further includes a support that supports the second dust separating unit at an inclination angle.

4. The dust collecting unit of claim 1, wherein the dust passage is provided on an outer portion of the dust collecting body.

5. The dust collecting unit of claim 4, wherein the cover member extends across upper portions of both the dust collecting body and the dust passage.

6. The dust collecting unit of claim 1, wherein a dust inlet is formed on a side of the dust collecting body, and wherein dust separated from the second dust separating unit is introduced from the dust passage into the second dust storing unit via the dust inlet.

7. The dust collecting unit of claim 1, wherein a passage guide is formed on an outer surface of the dust collecting body, wherein the passage guide forms at least a portion of the dust passage, and wherein the passage guide is integrally formed with or coupled to the dust collecting body.

8. The dust collecting unit of claim 1, wherein a guide is mounted on an inner portion of the dust collecting body, and wherein the guide forms at least a portion of the second dust storing unit.

9. The dust collecting unit of claim 8, wherein the second dust storing unit is defined by the guide and inner surfaces of the dust collecting body.

10. The dust collecting unit of claim 8, wherein the guide comprises:
an inner guide extending from a periphery of the dust collecting body into the dust collecting body; and
an outer guide coupled to the inner guide.

11. The dust collecting unit of claim 10, wherein the outer guide can move relative to the inner guide to vary a volume of the second dust storing unit.

12. The dust collection unit of claim 10, wherein the outer guide and the inner guide define at least a portion of the first dust storing unit and the second dust storing unit.

13. A vacuum cleaner comprising the dust collection unit of claim 1.

14. A dust collecting unit of a vacuum cleaner, comprising:
a dust collecting body including a first dust separating unit for separating dust from a flow of air and a first dust storing unit for storing dust separated from the first dust separating unit;
a second dust separating unit that further separates dust from the flow of air after the flow of air has left the first dust separating unit, the second dust separating unit being provided on an outer upper portion of the dust collecting body;
a second dust storing unit provided within the first dust storing unit and configured to store dust separated by the second dust separating unit;

a passage that extends between the second dust separating unit and the second dust storing unit, the passage being formed on an outer portion of the dust collecting body;

a dust inlet formed on the dust collecting body, wherein dust from the second dust separating unit passes from the passage into the second dust storing unit via the dust inlet; and a lower cover that selectively and simultaneously opens and closes a lower portion of the first and second dust storing units, wherein the second dust storing unit is defined by a first guide and a second guide, and the second guide can move relative to the first guide to vary a volume of the first and second dust storing units, and wherein the first guide and the second guide define at least a portion of the first dust storing unit and partition the first dust storing unit and the second dust storing unit.

15. The dust collecting unit of claim 14, further comprising a cover member that covers upper portions of the dust collecting body and the passage, wherein the second dust separating unit is provided on the cover member.

16. The dust collecting unit of claim 14, wherein the second dust separating unit includes a plurality of cyclone units.

17. The dust collecting unit of claim 14, wherein a discharge portion of the second dust separating unit is located over the passage.

* * * * *